United States Patent [19]

Ahn et al.

[11] Patent Number: 6,084,965
[45] Date of Patent: Jul. 4, 2000

[54] IDENTIFICATION SCHEME, DIGITAL SIGNATURE SCHEME GIVING MESSAGE RECOVERY AND DIGITAL SIGNATURE SCHEME WITH APPENDIX

[75] Inventors: Keum Hyug Ahn; Yun Ho Lee; Ill Hwan Park; Chung Ryong Jang, all of Seoul, Rep. of Korea

[73] Assignee: Korea Telecommunication Authority, Seoul, Rep. of Korea

[21] Appl. No.: 08/649,457

[22] Filed: May 17, 1996

[30] Foreign Application Priority Data

May 17, 1995 [KR] Rep. of Korea ..................... 95-12289

[51] Int. Cl.[7] ................................ H04K 1/00; H04L 9/00
[52] U.S. Cl. ............................................... 380/28; 380/25
[58] Field of Search .................... 380/4, 21, 28, 380/29, 30, 25

[56] References Cited

U.S. PATENT DOCUMENTS

| | | | |
|---|---|---|---|
| 4,625,076 | 11/1986 | Okamoto et al. | 178/22.11 |
| 4,969,189 | 11/1990 | Ohta et al. | 380/25 |
| 5,140,634 | 8/1992 | Guillou et al. | 380/23 |
| 5,396,558 | 3/1995 | Ishiguro et al. | 380/25 |
| 5,442,707 | 8/1995 | Miyaji et al. | 380/30 |
| 5,446,796 | 8/1995 | Ishiguro et al. | 380/24 |
| 5,483,597 | 1/1996 | Stern | 380/30 |

*Primary Examiner*—Max Noori
*Attorney, Agent, or Firm*—Merchant & Gould P.C.

[57] ABSTRACT

An identification scheme, a digital signature scheme giving message recovery, and a digital signature scheme with appendix are disclosed. In processing and transmitting information, a transmitting counterpart of a transmission message is confirmed. The unauthorized modification of the message is confirmed and transmitting behavior is detected, thereby providing the reliable information service.

12 Claims, 3 Drawing Sheets

---

SIGNER (USER A)

SYSTEM COEFFICIENTS; $g$, $q$ AND $p$
PUBLIC KEYS; $v_1 (\equiv g^{-a} \bmod p)$ AND
$v_2 (\equiv g^{-b} \bmod p)$ MESSAGE TO BE SIGNED; $m$
GENERATE RANDOM NUMBERS $r_1, r_2$ AND $r_3$
CALCULATE $x(\equiv mg^{-r_1} \bmod p)$, YIELD $h(x, ID_A)$
CALCULATE $r_4(\equiv r_1 + ar_2 \bmod q)$, AND
$r_5(\equiv ar_3 + b \bmod q)$, AND
CALCULATE $y_1(\equiv r_4 + r_5 h(x, ID_A) \bmod q)$
AND $y_2(\equiv r_2 + r_3 h(x, ID_A) \bmod q)$.

→ $ID_A, v_1, v_2$ →

→ $x, y_1, y_2$ →

VERIFIER (USER B)

CONFIRM $ID_A$, $v_1$ AND $v_2$.

YIELD $h(x, ID_A)$,
RECOVER MESSAGE $m$ BY CALCULATING
$(\equiv x g^{y_1} v_1^{y_2} v_2^{h(x,ID_A)} \bmod p)$
AND VERIFY THE VALIDATION OF DIGITAL SIGNATURE $(x, y_1, y_2)$
BY CONFIRMING THE CONTENTS OF THE RECOVERED MESSAGE.

IDENTIFICATION SCHEME, DIGITAL SIGNATURE SCHEME GIVING MESSAGE RECOVERY AND DIGITAL SIGNATURE SCHEME WITH APPENDIX

BACKGROUND OF THE INVENTION

The present invention relates to an identification scheme based on security according to difficulty in calculating discrete logarithms, and a digital signature scheme giving message recovery and a digital signature scheme with appendix for authenticating each identity processing information, protecting the integrity of transferred information and preventing fraudulent information processing behavior.

A digital signature corresponding to a conventional manual signature is used to confirm a communicating counterpart, to prevent the unauthorized modification of the communication contents and to solve a dispute about communication behavior. A method for generating the digital signature can be classified into a digital signature scheme with appendix and a digital signature scheme giving message recovery, according to forms and functions of the generated digital signature.

Assuming that p is a large prime number, q is another prime number for dividing p−1, g is a natural number having a remainder 1 obtained by dividing its $q^{th}$ power by p, g being between 1 and p, then g, q and p are system coefficients commonly utilized by users. If each user randomly selects a natural number s between 1 and q as a secret key and uses, as a public key, a remainder v ($\equiv g^{-s}$ mod p) obtained by dividing the $-s^{th}$ power of g by p, public coefficients used by each user are v, g, q and p.

It is hard to find out the secret key s from these public coefficients and therefore it is equivalent that a problem of discrete logarithms is difficult to calculate. Numerous public key identification schemes and digital signature schemes are based on security strength from the fact that the problem of the discrete logarithms is difficult to calculate.

Schnorr published the identification scheme and the digital signature scheme based on the security of the discrete logarithms in 1989. The digital signature scheme published by Schnorr, which is the digital signature scheme with appendix, introduces a hash compression function to the digital signature scheme published by Elgamal in 1985, and simplifies the procedure for generating and verifying the digital signature. Moreover, the generated digital signature is small in size.

The identification scheme proposed by Schnorr uses the same logarithm structure as the digital signature scheme, and authenticates one's own identity to a communicating counterpart.

The identification scheme proposed by Schnorr in which a prover A authenticates his identity to a verifier B will now be described.

If the prover's system coefficients are g, q and p, the secret key is s (1<s<q), and the public key is v ($\equiv g^{-s}$ mod p), the prover A selects a random number r between 1 and g and transmits a remainder x ($\equiv g^r$ mod p) obtained by dividing the $r^{th}$ power of g by p to the verifier B. If x is received from the prover A, the verifier B selects a random number e between 1 and q and transmits the number e to the prover A. The prover A multiplies the random number e received from the verifier B by the secret key s and adds the random number r, to yield r+se. The prover A transmits a remainder y ($\equiv$ r+se mod q) obtained by dividing r+se by q to the verifier B. If y is received from the prover A, the verifier B calculates a remainder x' ($\equiv g^y v^e$ mod p) obtained by dividing the product of the $y^{th}$ power of g and the $e^{th}$ power of v by p. The verifier B authenticates the validation of prover's identity by confirming whether x' and x are identical to each other.

In the digital signature scheme with appendix proposed by Schnorr, if a message to be signed is m, a signer A selects a random number r between 1 and q and calculates a remainder x ($\equiv g^r$ mod p) obtained by dividing the $r^{th}$ power of g by p. The message m and the calculated x are applied to the hash function to yield e (=h(x, m)). The signer A calculates a remainder y ($\equiv$ r+se mod q) obtained by dividing r added to the product of s and e by q. Then (e, y) is the digital signature with appendix for the message m. The validation of the digital signature (e, y) with appendix for the message m is easily verified since a singer's public key is known.

That is, if the digital signature with appendix of the signer A for the message m is (e, y), the verifier B calculates a remainder x' ($\equiv g^y v^e$ mod p) obtained by dividing the product of the $y^{th}$ power of g and the $e^{th}$ power of v by p. The remainder x' and the message m are applied to the hash function to yield e' (=h(x', m). The validation of the digital signature (e, y) with appendix of the signer A is verified by confirming whether e' and e are the same.

Meanwhile, Nyberg and Rueppel published the digital signature scheme giving message recovery based on security of the discrete logarithms in 1993. The digital signature scheme giving message recovery of N-R (Nyberg-Rueppel) will now be described.

It is assumed that the signer's system coefficients are g, q and p, the secret key is s (1<s<q), the public key is v ($\equiv g^{-s}$ mod p), and the message to be signed is m, m being a natural number which is greater than or equal to 1, and less than or equal to the prime number p. The signer selects a random number r between 1 and q, and calculates a remainder x ($\equiv mg^{-r}$ mod p) obtained by dividing the product of the message m and the $-r^{th}$ power of g by p. The singer adds r to the secret key s multiplied by x to yield r+sx and calculates a remainder y ($\equiv$ r+sx mod q) obtained by dividing r+sx by q. Then (x, y) is the digital signature giving message recovery for the message m.

To verify the digital signature (x, y), the verifier calculates a remainder($\equiv xg^y v^x$ mod p) obtained by dividing the product of x and the $y^{th}$ power of g and the $x^{th}$ power of v by p, to recover the message m. The verifier verifies the validation of the digital signature (x, y) by confirming the contents of the recovered message m.

However, the digital signature with appendix generates only the digital signature for the message. In the digital signature giving message recovery, if the message to be signed is larger in size than p, the message m should be divided into various messages smaller than p. Since the digital signature is generated for the divided messages, the size of the generated digital signature is increased.

SUMMARY OF THE INVENTION

It is therefore an object of the invention to provide an identification scheme for confirming a communicating counterpart of a transmission message in processing and transmitting information.

It is another object of the invention to provide a digital signature scheme giving message recovery for confirming the unauthorized modification of a message and detecting transmitting behavior.

It is still another object of the invention to provide a digital signature scheme with appendix for confirming the unauthorized modification of a message and detecting transmitting behavior.

In accordance with one aspect of the invention, a method for generating a digital signature giving message recovery and verifying the generated digital signature when system coefficients are g, q and p, comprising the steps of:

(for a signer) selecting a first random number r1, calculating a first remainder x ($\equiv mg^{-r1}$ mod p) obtained by dividing the product of a message m and the $-r1^{th}$ power of g by p, and applying said first remainder x and a singer's identification ID to a hash function to yield h(x, ID);

(for said signer) selecting second and third random numbers r2 and r3, calculating a second remainder r4 ($\equiv$r1+ar2 mod q) obtained by dividing, by q, said first random number r1 added to the product of a first secret key a and said second random number r2, and calculating a third remainder r5 ($\equiv$ar3+b mod q) obtained by dividing, by q, a second secret key b added to the product of said first secret key a and said third random number r3;

calculating a fourth remainder y1 ($\equiv$r4+r5 h(x, ID) mod q) obtained by dividing, by q, said second remainder r4 added to the product of said third remainder r5 and h(x, ID), and calculating a fifth remainder y2 ($\equiv$r2+r3 h(x, ID) mod q) obtained by dividing, by q, said second random number r2 added to the product of said third random number r3 and h(x, ID), thus to generate a digital signature (x, y1, y2) for said message m;

(for a verifier) applying said first remainder x and said signer's identification ID to said hash function to yield h(x, ID); and recovering said message m contained in said first remainder x by calculating a remainder ($\equiv xg^{y1}v1^{y2}v2^{h(x,\ ID)}$ mod p) obtained by dividing, by p, the product of said first remainder x and the y1$^{th}$ power of g and the y2$^{th}$ power of a first public key v1 ($\equiv g^{-a}$ mod p) and the $\{h(x, ID)\}^{th}$ power of a second public key v2 ($\equiv g^{-b}$ mod p), and verifying the validation of said digital signature (x, y1, y2) by confirming the contents of the recovered message.

In accordance with another aspect of the invention, a method for generating a digital signature with appendix and verifying the generated digital signature when system coefficients are g, q and p, comprising the steps of:

(for a signer) selecting a first random number r1, applying a message m and a signer's identification ID to a hash function to yield h(ID, m), calculating a first remainder x ($\equiv$h(ID, m)$g^{-r1}$ mod p) obtained by dividing, by p, the product of h(ID, m) and the $-r1^{th}$ power of g, and applying said first remainder x and said message m to said hash function to yield h(x, m);

selecting second and third random numbers r2 and r3, calculating a second remainder r4 ($\equiv$r1+ar2 mod q) obtained by dividing, by q, said first random number r1 added to the product of a first secret key a and said second random number r2, and calculating a third remainder r5 ($\equiv$ar3+b mod q) obtained by dividing, by q, a second secret key b added to the product of said first secret key a and said third random number r3;

calculating a fourth remainder y1 ($\equiv$r4+r5 h(x, m) mod q) obtained by dividing, by q, said second remainder r4 added to the product of said third remainder r5 and h(x, m), and calculating a fifth remainder y2 ($\equiv$r2+r3 h(x, m) mod q) obtained by dividing, by q, said second random number r2 added to the product of said third random number r3 and h(x, m), thus to generate a digital signature (x, y1, y2) for said message m;

(for a verifier) applying said first remainder x and said message m to said hash function to yield h(x, m), and recovering h(ID, m) by calculating a sixth remainder ($\equiv xg^{y1}v1^{y2}v2^{h(x,\ m)}$ mod p) obtained by dividing, by p, the product of said first remainder x and the y1$^{th}$ power of g and the y2$^{th}$ power of a first public key v1 ($\equiv g^{-a}$ mod p) and the $\{h(x, m)\}^{th}$ power of a second public key v2 ($\equiv g^{-b}$ mod p); and verifying the validation of said digital signature (x, y1, y2) by confirming whether the recovered h(ID, m) is equal to h(x, ID) obtained by applying said signer's identification ID and said message m to said hash function.

In accordance with still another aspect of the invention, a method for authenticating user's identity when system coefficients are g, q and p, comprising the steps of:

(for a prover) selecting a first random number r1, making out authentication information I including a prover's identification and a current time, transmitting a first remainder x ($\equiv$I$g^{-r1}$ mod p) obtained by dividing the product of said authentication information I the $-r1^{th}$ power of g by p to a verifier, and (for said verifier) transmitting a second random number e to said prover;

(for said prover) applying said first remainder x and said second random number e to said hash function to yield h(x, e), selecting second and third random numbers r2 and r3, calculating a second remainder r4 ($\equiv$r1+ar2 mod q) obtained by dividing, by g, said first random number r1 added to the product of a first secret key a and said second random number r2, and calculating a third remainder r5 ($\equiv$ar3+b mod q) obtained by dividing, by q, a second secret key b added to the product of said first secret key a and said third random number r3; and calculating a fourth remainder y1 ($\equiv$r4+r5 h(x, e) mod q) obtained by dividing, by q, said second remainder r4 added to the product of said third remainder r5 and h(x, e), and calculating a fifth remainder y2 ($\equiv$r2+r3 h(x, e) mod q) obtained by dividing, by q, said second random number r2 added to the product of said third random number r3 and h(x, e), thus to generate a digital signature (x, y1, y2) for said message m;

(for said verifier) recovering said authentication information I contained in said first remainder x by calculating a remainder ($\equiv xg^{y1}v1^{y2}v2^{h(x,\ e)}$ mod p) obtained by dividing, by p, the product of said first remainder x and the y1$^{th}$ power of g and the y2$^{th}$ power of a first public key v1 ($\equiv g^{-a}$ mod p) and the $\{h(x, e)\}^{th}$ power of a second public key v2 ($\equiv g^{-b}$ mod p), and authenticating prover's identity by confirming the contents of the recovered authentication information.

The present invention is more specifically described with reference to the accompanying drawings.

BRIEF DESCRIPTION OF THE ATTACHED DRAWINGS

DETAILED DESCRIPTION OF PREFERRED EMBODIMENT

Figure 1:
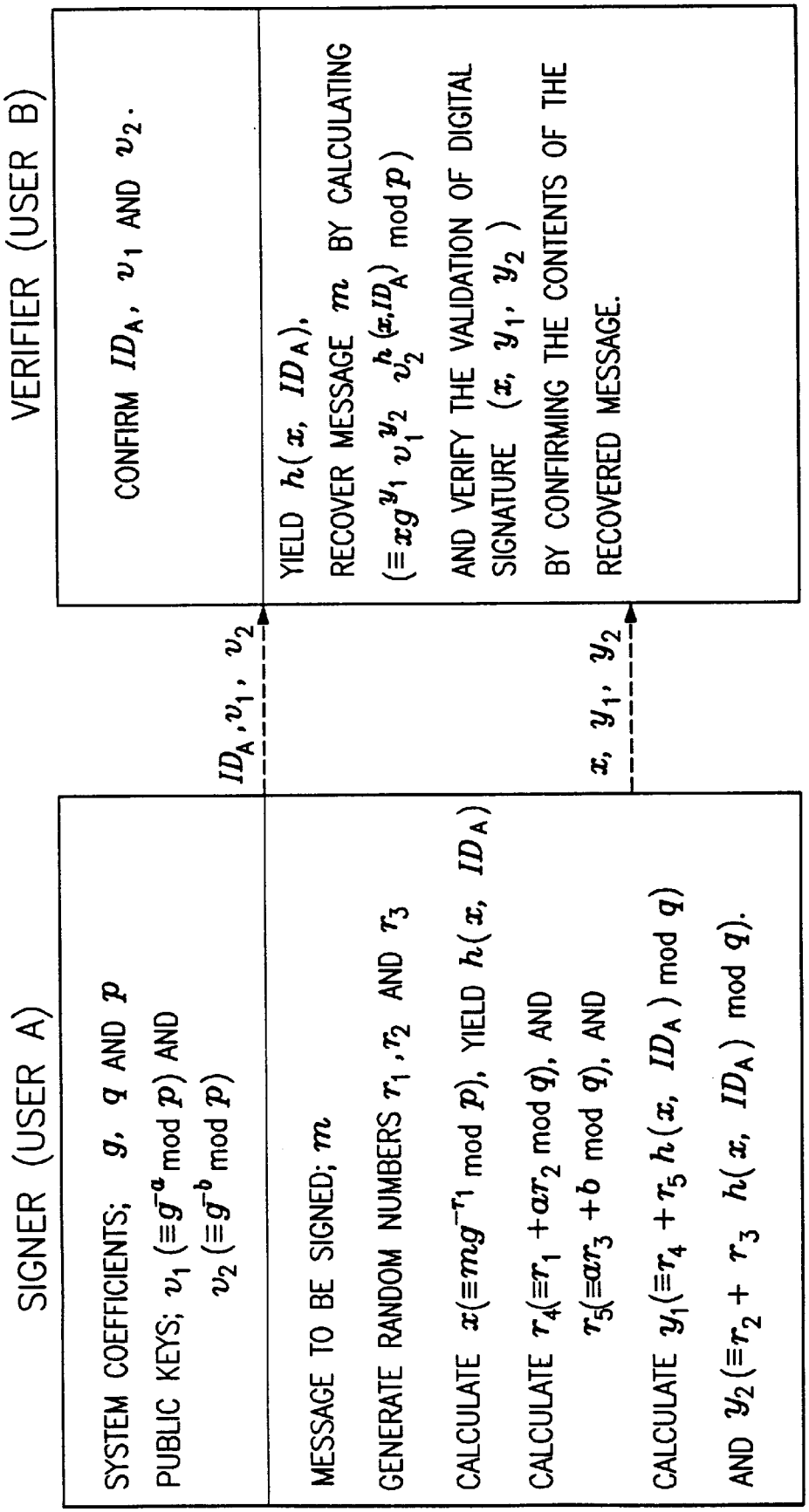
FIG. 1 shows a process for a digital signature scheme giving message recovery according to the present invention.

Referring to FIG. 1, each user has two secret keys and two public keys corresponding thereto, and can generate a digital signature for a message to be signed. If the message to be signed is m, the signer's secret keys are a and b, and the public keys are v1 ($\equiv g^{-a}$ mod p) and v2 ($\equiv g^{-b}$ mod p), each user commonly uses a hash function h and system coefficients g, q and p. When using a digital signature scheme, a unique identification (ID) is assigned to each user from a key authentication center.

A signer A selects a random number r1 between 1 and q and calculates a remainder x ($\equiv mg^{-r1}$ mod p) obtained by dividing the product of the message m and the $-r_1^{th}$ power of g by p. The signers A applies the remainder x and his identification $ID_A$ to the hash function to yield $h(x, ID_A)$. The signer A selects random numbers r2 and r3 between 1 and q, and calculates r4 ($\equiv r1+ar2$ mod q), r5 ($\equiv ar3+b$ mod q), y1 ($\equiv r4+h(x, ID_A)r5$ mod q), and y2 ($\equiv r2+h(x, ID_A)r3$ mod q).

Instead of calculating y1 and y2 using $h(x, ID_A)$ after the random numbers r2 and r3 are selected, and r4 and r5 are calculated using the secret keys a and b, one random number r2 may be selected as y2, and y1 may be calculated using the secret keys a and b and the calculated $h(x, ID_A)$. That is, the signer A selects the random number r2 between 1 and q as y2. Then y1 is calculated by the following expression $y1 \equiv r1+h(x, ID_A)b+ay2$ mod q. Thus, the obtained value (x, y1, y2) is the digital signature giving message recovery for the message m.

To verify the digital signature (x, y1, y2), a verifier B applies x and the signer's identification $ID_A$ to the hash function to yield $h(x, ID_A)$. The message m is recovered by calculating a remainder ($\equiv xg^{y1}v1^{y2}v2^{h(x,IDA)}$ mod p) obtained by dividing, by p, the product of x and the $y1^{th}$ power of g and the $y2^{th}$ power of the public key v1 and the $\{h(x, ID_A)\}^{th}$ power of the public key v2. The verifier B verifies the validation of the signature for the message m by confirming the contents of the recovered message m.

Figure 2:
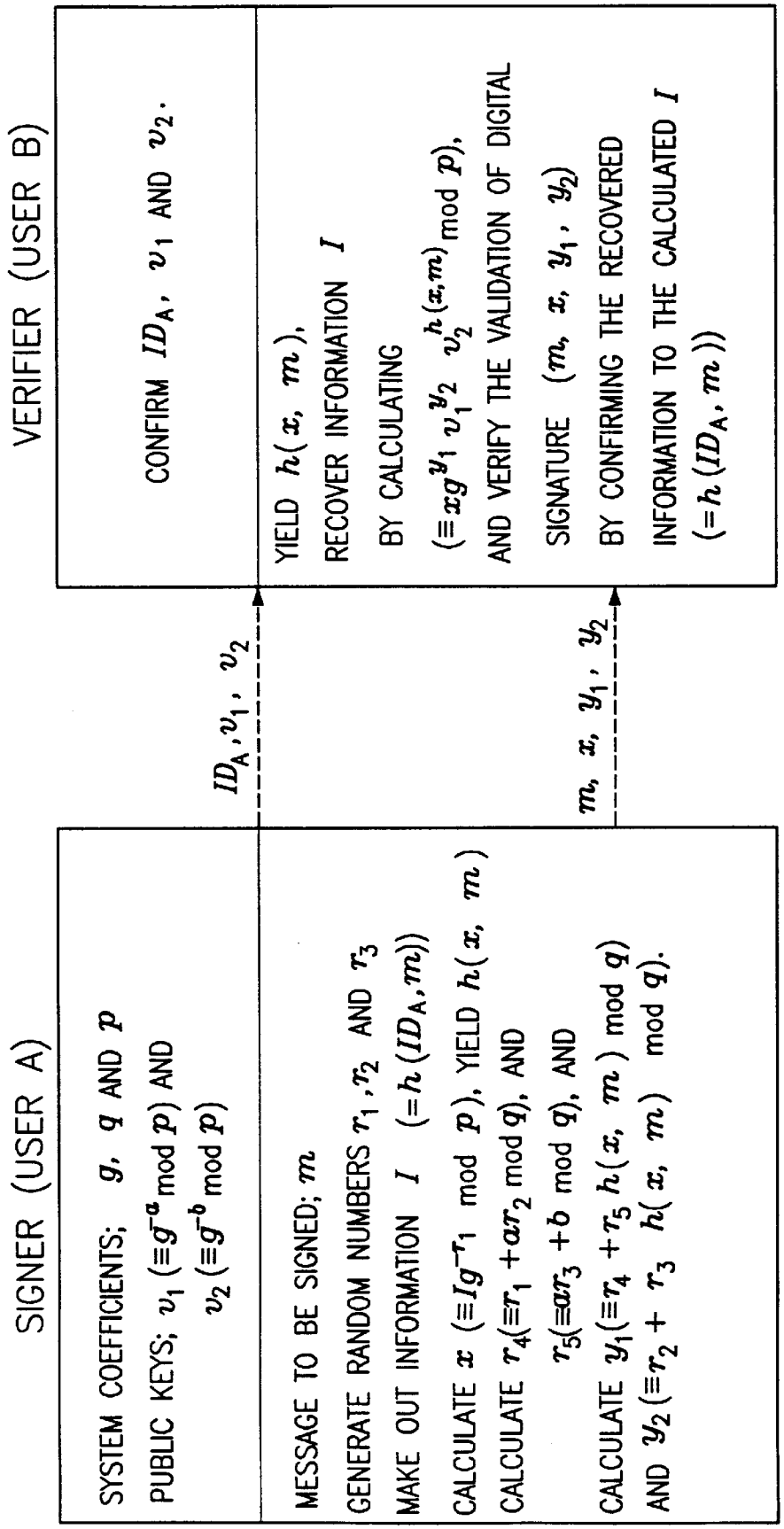
FIG. 2 shows a process for a digital signature scheme with appendix according to the present invention.

FIG. 2 shows a process for a digital signature scheme with appendix according to the present invention. The generated digital signature is added to the end of a signed message and is processed in pairs together with the signed message.

The signer A applies his identification $ID_A$ and the message m to the hash function to yield I (=$h(ID_A, m)$). The signer also makes out I by appending the security related data, e.g. the description for the corresponding message and the time when the digital signature is generated through a computer terminal. The signer A selects a random number r1 between 1 and q, and calculates a remainder x ($\equiv Ig^{-r1}$ mod p) obtained by dividing the product of I and the $-r1^{th}$ power of g by p. The signer A applies x and the message m to the hash function to yield h(x, m). The signer A selects random numbers r2 and r3 between 1 and q and calculates r4 ($\equiv r1+ar2$ mod q), r5 ($\equiv ar3+b$ mod q), y1 ($\equiv r4+h(x, m)r5$ mod q) and y2 ($\equiv r2+h(x, m)r3$ mod q).

Instead of calculating y1 and y2 using h(x, m) after the random numbers r2 and r3 are selected, and r4 and r5 are calculated using the secret keys a and b, one random number r2 may be selected as y2, and y1 may be calculated using the secret keys a and b, and h(x, m). In more detail, the signer A selects the random number r2 between 1 and q as y2. The remainder y1 is calculated by the following expression $y1 \equiv r1+h(x, m)b+ay2$ mod q. Thus (x, y1, y2) is the digital signature with appendix for the message m and is processed together with the message m as (m, x, y1, y2).

To verify the digital signature (m, x, y1, y2) with appendix, the verifier B calculates h(x, m) by applying x and the message m in the digital signature (m, x, y1, y2) to the hash function. I is recovered by calculating a remainder ($\equiv xg^{y1}v1^{y2}v2^{h(x, m)}$ mod p) obtained by dividing, by p, the product of x and the $y1^{th}$ power of g and the $y2^{th}$ power of v1 and $\{h(x,m)\}^{th}$ power of v2. The verifier B applies the signer's identification $ID_A$ and the message m to the hash function to obtain $h(ID_A, m)$. The validation of the digital signature with appendix for the message m is verified by confirming whether the obtained $h(ID_A, m)$ is equal to the recovered I.

Therefore, the digital signature giving message recovery and the digital signature with appendix are appropriately used according to the length of binary bit sequence of the message to be signed. If the size of the message is small, the signer uses the digital signature giving message recovery. Since the verifier can recover the signed message from the result of verifying the validation of the digital signature, the amount of communication between the signer and the verifier can be reduced. If the size of the message is large, the digital signature with appendix is used to generate the digital signature including information such as a description phrase of the signer, a signed time, etc.

That is, the signer applies his identification ID and the message m to the hash function to obtain h(ID, m). The signer appends the description phrase for the message m to h(ID, m). The signer makes out I (=$h(ID_A, Im)$, a description phrase, a signed time) by appending the description for the corresponding message and the time when the digital signature is generated through a computer terminal, and generates the digital signature with appendix.

Figure 3:
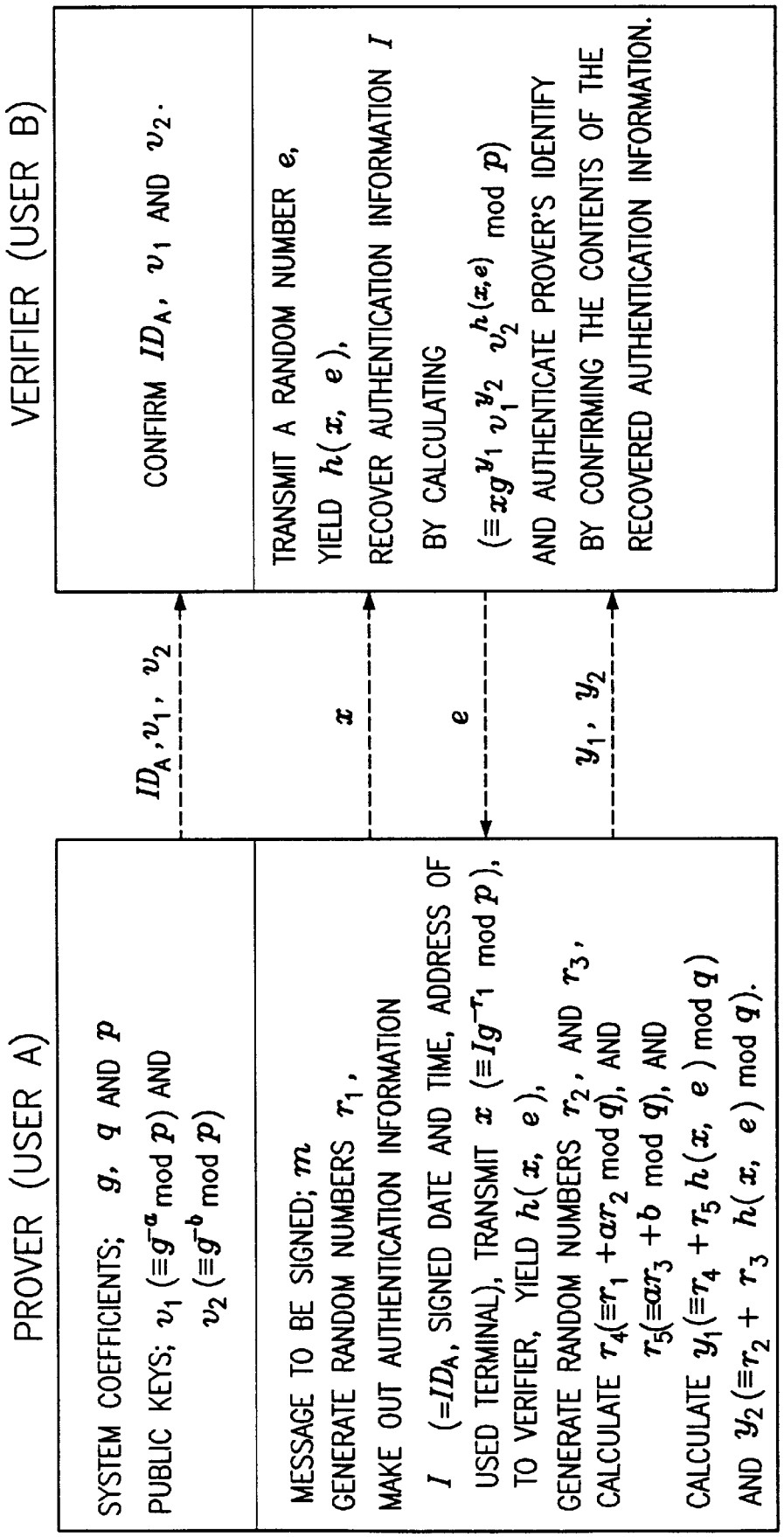
FIG. 3 shows a process for an identification scheme according to the present invention.

FIG. 3 shows a process for an identification scheme according to the present invention. To enhance security, each user may use 2 secret keys, and 2 public keys corresponding thereto. Random numbers a and b between 1 and q are selected as the secret keys. The public keys are v1 ($\equiv g^{-a}$ mod p) and v2 ($\equiv g^{-b}$ mod p). To prove one's own identity to a verifier B, a prover A selects a random number r1 between 1 and q and calculates the $-r1^{th}$ power of g. The prover A makes out information I (=$ID_A$, signed date and time, address of used terminal, etc.) including his identification $ID_A$, the signed date and time, a host computer address or a node address indicating a position of a used terminal and the like, and transmits x ($\equiv Ig^{-r1}$ mod p) to the verifier B. Authentification information I can be 1.

If x is received from the prover A, the verifier B selects a random number e between 1 and q and transmits the random number e to the prover A. The prover A applies e and x to the hash function to yield h(x, e). Numbers r2 and r3 between 1 and q are randomly selected by the prover A, and r4 ($\equiv r1+ar2$ mod q) and r5 ($\equiv ar3+b$ mod q) are calculated. The prover A transmits y1 ($\equiv r4+h(x, e)r5$ mod q) and y2 ($\equiv r2+h(x, e)r3$ mod q) to the verifier B.

In the above description, y1 and y2 are calculated using h(x, e) after selecting the random numbers r2 and r3 and calculating r4 and r5 using the secret keys a and b. However, one random number r2 may be selected as y2, and y1 may be calculated using a and b, h(x, e). In more detail, the prover A selects the random number r2 between 1 and q as y2, and the remainder y1 is obtained by the following expression $y1 \equiv r1+h(x, e)b+ay2$ mod q). The prover A transmits y1 and y2 to the verifier B.

If y1 and y2 are received from the prover A, the verifier B recovers the authentication information I by calculating $xg^{y1}v1^{y2}v2^{h(x, e)}$ mod p. The verifier B authenticates prover's identity by confirming the contents of the recovered authentication information I.

In the other hand, the random number −r1 can be used instead of the random number r1.

As described above, the reliable information service is possible and a communicating counterpart can be effectively authenticated.

What is claimed is:

1. A method for generating a digital signature giving message recovery and verifying the generated digital signature when system coefficients are g, q and p, wherein p and q are prime numbers different from each other, g is a natural number between 1 and p and a remainder obtained by dividing $q^{th}$ power of g by p is 1, the method comprising the steps of:

for a signer, selecting a first random number r1, calculating a first remainder $x \equiv mg^{-r1}$ mod p, wherein m is a message, and applying the first remainder x and a signer's identification ID to a hash function to generate h(x, ID);

for the signer, selecting second and third random numbers r2 and r3, calculating a second remainder $r4 \equiv r1+ar2$ mod q, wherein a is a first secret key, and calculating a third remainder $r5 \equiv ar3+b$ mod q, wherein b is a second secret key;

calculating a fourth remainder $y1 \equiv r4+r5\ h(x, ID)$ mod q and calculating a fifth remainder $y2 \equiv r2+r3\ h(x, ID)$ mod q, thus to generate a digital signature (x, y1, y2) for the message m;

for a verifier, applying the first remainder x and the signer's identification ID to the hash function to generate h(x, ID); and recovering the message m contained in the first remainder x by calculating a remainder $\equiv xg^{y1}v1^{y2}v2^{h(x,\ ID)}$ mod p, wherein v1 is a first public key, $v1 \equiv g^{-a}$ mod p, v3 is a second public key and $v2 \equiv g^{-b}$ mod p, and verifying the validation of the digital signature (x, y1, y2) by confirming the contents of the recovered message.

2. A method for generating a digital signature giving message recovery and verifying the generated digital signature when system coefficients are g, q and p, wherein p and q are prime numbers different from each other, g is a natural number between 1 and p and a remainder obtained by dividing $g^{th}$ power by g by p is 1, the method comprising the steps of:

for a signer, selecting a first random number r1, calculating a first remainder $x \equiv mg^{-r1}$ mod p, wherein m is a message, and applying the first remainder x and a signer's identification ID to a hash function to generate h(x, ID);

selecting a random number r2 between 1 and q to be used as y2, calculating a first remainder $y1 \equiv r1+h(x, ID)b+ay2$ mod q, wherein a is a first secret key and b is a second secret key, thus to generate a digital signature (x, y1, y2) for the message m;

for a verifier, applying the first remainder x and the signer's identification ID to the hash function to generate h(x, ID); and recovering the message m contained in the first remainder x by calculating a remainder $\equiv xg^{y1}v1^{y2}v2^{h(x,\ ID)}$ mod p wherein v1 is a first public key, $v1 \equiv g^{-a}$ mod p, v2 is a second public key, $v2 \equiv g^{-b}$ mod p, and verifying the validation of the digital signature (x, y1, y2) by confirming the contents of the recovered message.

3. A method for generating a digital signature with appendix and verifying the generated digital signature when system coefficients are g, q and p, wherein p and q are prime numbers different from each other, g is a natural number between 1 and p and a remainder obtained by dividing $q^{th}$ power of g by p is 1, the method comprising the steps of:

for a signer, selecting a first random number r1, applying a message m and a signer's identification ID to a hash function to generate h(ID, m), by calculating a first remainder $x \equiv h(ID, m)g^{-r1}$ mod p, and applying the first remainder x and the message m to the hash function to generate h(x, m);

selecting second and third random numbers r2 and r3, calculating a second remainder $r4 \equiv r1+ar2$ mod q, (wherein a is a first secret key, and calculating a third remainder $r5 \equiv ar3+b$ mod q, wherein b is a second secret key;

calculating a fourth remainder $y1 \equiv r4+r5\ h(x, m)$ mod q, and calculating a fifth remainder $y2 \equiv r2+r3\ h(x, m)$ mod q, thus to generate a digital signature (x, y1, y2) for the message m;

for a verifier, applying the first remainder x and the message m to the hash function to generate h(x, m), and recovering h(ID, m) by calculating a sixth remainder $\equiv xg^{y1}v1^{y2}v2^{h(x,\ m)}$ mod p, wherein v1 is a first public key, $v1 \equiv g^{-a}$ mod p, v2 is a second public key and $v2 \equiv g^{-b}$ mod p; and verifying the validation of the digital signature (x, y1, y2) by confirming whether the recovered h(ID, m) is equal to h(x, ID) obtained by applying the signer's identification ID and the message m to the hash function.

4. A method for generating a digital signature with appendix and verifying the generated digital signature when system coefficients are g, q and p, wherein p and q are prime numbers different from each other, g is a natural number between 1 and p and a remainder obtained by dividing $q^{th}$ power of g by p is 1, the method comprising the steps of:

for a signer, selecting a first random number r1, applying a message m and a signer's identification ID to a hash function to generate h(ID, m), calculating a first remainder $x \equiv h(ID, m)g^{-r1}$ mod p, and applying the first remainder x and the message m to the hash function to generate h(x, m);

selecting a second random number r2 between 1 and q to be used as y2, calculating a second remainder $y1 \equiv r1+h(x,m)b+ay2$ mod q, wherein a is a first secret key and b is a second secret key, thus to generate a digital signature (x, y1, y2) for the message m;

for a verifier, applying the first remainder x and the message m to the hash function to generate h(x, m), and recovering h(ID, m) by calculating a sixth remainder $\equiv xg^{y1}v1^{y2}v2^{h(x,\ m)}$ mod p, wherein v1 is a first public key, $v1\ g^{-a}$ mod p, v2 is a second public key and $v2 \equiv g^{-b}$ mod p and verifying the validation of the digital signature (x, y1, y2) by confirming whether the recovered h(ID, m) is equal to h(ID, m) obtained by applying the signer's identification ID and the message m to the hash function.

5. A method for authenticating user's identity when system coefficients are g, q and p, wherein p and q are prime numbers different from each other, g is a natural number between 1 and p and a remainder obtained by dividing qth power of g by p is 1, the method comprising the steps of:

for a prover, selecting a first random number r1, making out authentication information I including a prover's identification and a current time, transmitting a first remainder $x \equiv Ig^{-r1}$ mod p, to a verifier, and for the verifier, transmitting a second random number e to the prover;

for the prover, applying the first remainder x and the second random number e to the hash function to yield h(x, e), selecting second and third random numbers r2 and r3, calculating a second remainder $r4 \equiv r1+ar2$ mod q wherein a is a first secret key, and calculating a third remainder $r5 \equiv ar3+b \bmod q$, wherein b is a second secret key;

calculating a fourth remainder $y1 \equiv r4+r5\, h(x, e) \bmod q$, and calculating a fifth remainder $y2 \equiv r2+r3\, h(x, e) \bmod q$, thus to generate a digital signature (x, y1, y2) for the message m;

for a verifier, recovering the authentication information I contained in the first remainder x by calculating a remainder $\equiv xg^{y1}v1^{y2}v2^{h(x,\,ID)} \bmod p$, wherein v1 is a first public key $v1 \equiv g^{-a} \bmod p$, v2 is a second public key and $v2 \equiv g^{-b} \bmod p$, and authenticating prover's identity by confirming the contents of the recovered authentication information.

6. A method for authenticating user's identity as claimed in claim 5, wherein said authentication information I is 1.

7. A method for authenticating user's identity when system coefficients are g, q and p, wherein p and q are prime numbers different from each other, g is a natural number between 1 and p and a remainder obtained by dividing $q^{th}$ power of g by p is 1 the method comprising the steps of:

for a prover, selecting a first random number –r1, making out authentication information I including a prover's identification and a current time, transmitting a first remainder $x \equiv Ig^{r1} \bmod p$ to a verifier, and for the verifier, transmitting a second random number e to the prover;

for the prover, applying the first remainder x and the second random number e to the hash function to generate h(x, e), selecting second and third random numbers r2 and r3, calculating a second remainder $r4 \equiv -r1+ar2 \bmod q$, wherein a is a first secret key, and calculating a third remainder $r5 \equiv ar3+b \bmod q$, wherein b is a second secret key;

calculating a fourth remainder $y1 \equiv r4+r5\, h(x, e) \bmod q$, and calculating a fifth remainder $y2 \equiv r2+r3\, h(x, e) \bmod q$, thus to generate a digital signature (x, y1, y2) for the message m;

for a verifier, recovering the authentication information I contained in the first remainder x by calculating a remainder $\equiv xg^{y1}v1^{y2}v2^{h(x,\,e)} \bmod p$, wherein v1 is a first public key, $v1 \equiv g^{-a} \bmod p$, v2 is a second public and $v2 \equiv g^{-b} \bmod p$, and authenticating prover's identity by confirming the contents of the recovered authentication information.

8. A method for authenticating user's identity as claimed in claim 7, wherein said authentication information I is 1.

9. A method for authenticating user's identity when system coefficients are g, q and p, wherein p and q are prime numbers different from each other, g is a natural number between 1 and p and a remainder obtained by dividing $q^{th}$ power of g by p is 1, the method comprising the steps of:

for a prover, selecting a first random number r1, making out authentication information I including a prover's identification and a current time, transmitting a first remainder $x \equiv Ig^{-r1} \bmod p$, to a verifier, and for the verifier, transmitting a second random number e to the prover;

for the prover, applying the first remainder x and the second random number e to the hash function to generate h(x, e), selecting a random number r2 between 1 and q to be used as y2, calculating a first remainder $y1 \equiv r1+h(x, e)b+ay2 \bmod q$ wherein a is a first secret key and b is a second secret key, thus to generate a digital signature (x, y1, y2) for the message m;

for a verifer, recovering the authentication information I contained in the first remainder x by calculating a remainder $\equiv xg^{y1}v1^{y2}v2^{h(x,\,e)} \bmod p$, and authenticating prover's identity by confirming the contents of the recovered authentication information.

10. A method for authenticating user's identity as claimed in claim 9, wherein said authentication information I is 1.

11. A method for authenticating user's identity when system coefficients are g, q and p, wherein p and q are prime numbers different from each other, g is a natural number between 1 and p and a remainder obtained by dividing $q^{th}$ power of g by p is 1, the method comprising the steps of:

for a prover, selecting a first random number –r1, making out authentication information I including a prover's identification and a current time, transmitting a first remainder $x \equiv Ig^{r1} \bmod p$ to a verifier, and for the verifier, transmitting a second random number e to the prover;

for the prover, applying the first remainder x and the second random number e to the hash function to generate h(x, e), selecting a random number r2 between 1 and q as y2, calculating a first remainder $y1 \equiv -r1+h(x, e)b+ay2 \bmod q$, wherein a is a first secret key and b is a second secret key, thus to generate a digital signature (x, y1, y2) for the message m; and for a verifier, recovering the authentication information I contained in the first remainder x by calculating a remainder $\equiv xg^{y1}v1^{y2}v2^{h(x,\,e)} \bmod p$, and authenticating prover's identity by confirming the contents of the recovered authentication information.

12. A method for authenticating user's identity as claimed in claim 11, wherein said authentication information I is 1.

* * * * *